April 30, 1968  W. H. WILKINSON  3,380,565

CLUTCH

Filed Feb. 3, 1966  3 Sheets-Sheet 1

INVENTOR.
William H. Wilkinson
BY
*A. H. Cover*
Attorney

April 30, 1968 W. H. WILKINSON 3,380,565
CLUTCH
Filed Feb. 3, 1966 3 Sheets-Sheet 2

INVENTOR.
William H. Wilkinson
BY
A. H. Caser
Attorney

April 30, 1968 W. H. WILKINSON 3,380,565
CLUTCH
Filed Feb. 3, 1966 3 Sheets-Sheet 3

INVENTOR.
William H. Wilkinson
BY A. H. Caser
Attorney

United States Patent Office 3,380,565
Patented Apr. 30, 1968

3,380,565
CLUTCH
William H. Wilkinson, Upper Arlington, Ohio, assignor to Mobil Oil Corporation, New York, N.Y., a corporation of New York
Filed Feb. 3, 1966, Ser. No. 524,928
11 Claims. (Cl. 192—58)

ABSTRACT OF THE DISCLOSURE

An improved clutch is provided in which a viscoelastic liquid is employed for transmission of power and also for controlling disengagement while the driving member of the clutch is still operative. The power supplied by the drive is utilized for disengaging the clutch.

---

This invention relates to a clutch in which a liquid is employed to transmit power and also to control disengagement. It particularly relates to a clutch of this type which, while the driving member is still operative, utilizes the power supplied by the drive to disengage itself.

The clutch is useful in the drive train of a variety of process machinery, machine tools, and the like being interposed preferably at the motor, and usually mounted directly on the motor shaft. Engagement may be under control of a human operator or of a mechanical, pneumatic, hydraulic, electrical, etc. actuator. The clutch provides advantages in quiet, smooth operation, ease of control, and shock attenuation. Structurally, it has the advantages of mechanical simplicity, tolerance to imprecision, and mechanical compactness in respect of form and weight.

In essence, the clutch comprises a rotatable driving plate and axially spaced therefrom a rotatable driven plate. The adjacent surfaces of the plates form a pair of power transmitting surfaces having a clearance therebetween which is adapted to be filled with a viscoelastic liquid. When the clearance is so filled, the driving plate transmits torque to the driven plate by means of the viscous drag of this liquid. A reservoir or cylinder of the liquid is provided adjacent the clearance, together with manually- or mechanically-operated means for pumping liquid from the reservoir to the clearance. The liquid in the clearance is subjected to a rotary shearing stress as applied by the driving plate, and it undergoes rotary shear, producing a force normal to the plates. The liquid exhibiting this force, upon release of the pumping means, i.e., release of the pumping pressure, flows from the clearance back to the reservoir. With the clearance depleted, the viscous drag effect is not present, and the clutch is disengaged.

The invention may be better understood by referring to the accompanying drawings, wherein FIG. 1 shows a cross-sectional side view of the clutch;

Figure 1:
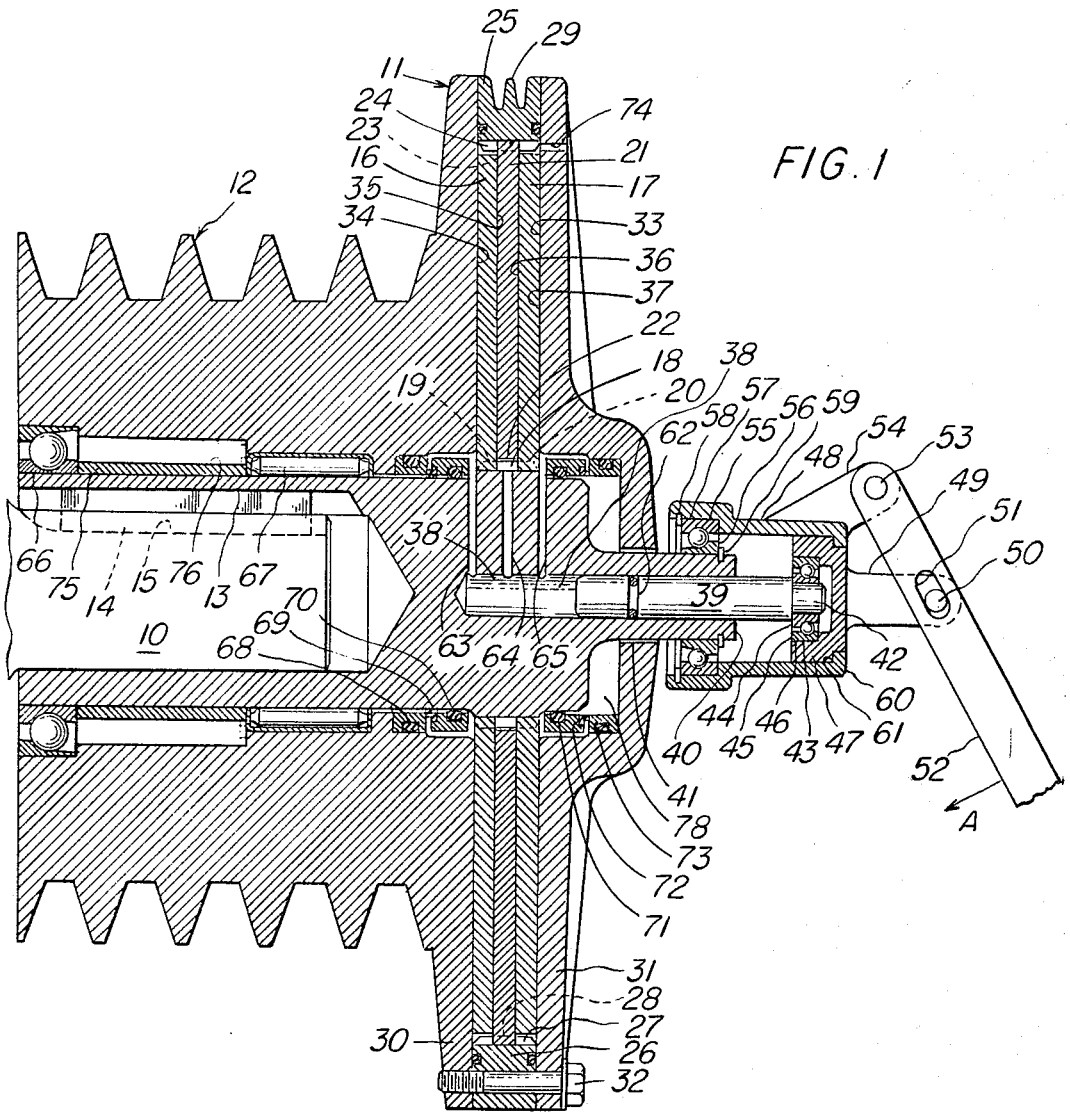

In FIG. 1 there is shown a driving member comprising the shaft 10 and a driven member comprising the rotatable housing or drum 11 and the integrally connected pulley 12.

The driving member also comprises the outer hollow shaft 13 which rotates with shaft 10 by virtue of the interengaging key and keyway 14, 15. Shaft 10 is driven by means not shown. Inside the housing 11, the shaft 13 carries a pair of driving plates 16 and 17 which are rotatable therewith, being mounted thereon by the interengaging key 18 and keyways 19, 20.

The driven member further comprises the driven plate 21, which is interleaved with the plates 16, 17 and is centrally apertured at 22 for mounting on and rotation relatively to shaft 13. Plate 21 is of larger diameter than plates 16, 17 and the peripheral portion thereof is slotted at 23 to receive a key 24 attached to the inner side of annular wall portion 25 which forms a part of the housing 11. Plate 21 also engages the annular wall portion 26, disposed 180° away from the portion 25, by means of a key and keyway arrangement at 27 and 28. It may be noted that wall portion 25 is serrated at 29 to dissipate heat, while the portion 26 is fixed to the housing end pieces 30, 31 as by means of the bolt 32. The portions 25, 26 may suitably alternate around the circumference of the housing 11. The end piece 30 is preferably integral with pulley 12.

It will be seen that the housing encloses a chamber 33 within which the plates 16, 17 and 21 are disposed, with plate 21 substantially bisecting the chamber.

Figure 2:
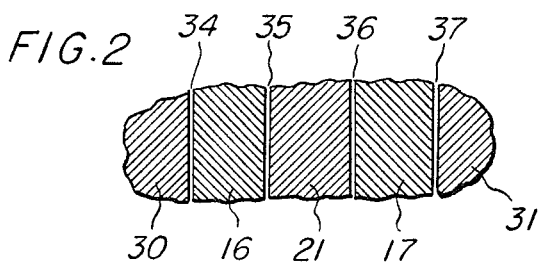
FIG. 2 is an enlarged view of a detail of FIG. 1.

Between adjacent surfaces of the plates, and including the surfaces of end walls 30, 31, clearances are present, as noted at 34, 35, 36 and 37. See FIG. 2. Each pair of surfaces defining a clearance may be designated a pair of power transmitting surfaces. When the clutch is engaged, a viscoelastic liquid is present in chamber 33, and particularly in the clearances, where it provides a driving connection between the driving and driven plates through the phenomenon of viscous drag.

Adjacent the clearances is a cylinder or reservoir 38 suitably located in the shaft 13 and having a piston 39 slideable therein. Shaft 13 has a reduced elongated hub portion 40 in which the piston is disposed, the drum 11 being apertured at 41 for reception of the hub. The piston has a reduced end portion 42 which is rotatably supported on bearing 43, the inner ring 44 of which has a tight fit on portion 42 while the outer ring 45 has a tight fit in opening 46 of the slideable end piece 47. The latter is slideable inside the cylindrical casing 48 and moves the piston with it. On its outer end the end piece 47 has an extension 49 which is provided with a lug 50 disposed in the slot 51 of lever 52, the latter being pivoted at 53 to an extension 54 of the casing 48. At its inner end the casing is mounted for rotation about the hub 40 by means of the bearing 55 whose inner and outer rings 56, 57 are press-fitted on hub 40 and casing 48, respectively. Axial movement of bearing 55 is further restricted by the snap ring 58 secured in the casing and the snap ring 59 on the hub.

It will be apparent that by pulling the lever 52 in the direction of the arrow A, piston 39 will move inwardly toward the cylinder 38, and by pulling the lever in the opposite direction, the piston will slide out of the cylinder. Inward movement of the piston is limited by the end of hub 40 which is met by the bearing 43, while outward movement of the piston is restricted by the internal flange 60 which engages the step 61 of the end piece 47. An oil seal 62 is provided on the piston.

The described viscoelastic liquid is present in cylinder 38 when the clutch is not engaged; that is, no liquid is present in chamber 33 or in the various clearances, and hence the phenomenon of viscous drag does not take place. To bring the clutch into engagement, the lever 52 is pulled in the direction of arrow A, thereby moving piston 39 into the cylinder 38 and displacing liquid therefrom. The displaced liquid flows through passages 63, 64, and 65 into the chamber 33 and thence into the various clearances. It will be understood of course that the drive shaft 10 is being rotated and drives shaft 13 through the interengaging key and keyway 14, 15. Drive shaft 13 in turn drives the plates 16 and 17 through the key and keyways at 18, 19 and 20. Driving plates 16 and 17 transmit power to the driven plate 21, and also to the end walls 30 and 31 of housing 11, through the viscous drag effect of the liquid present in clearances 34, 35, 36, and 37.

To disengage the clutch, the lever 52 is released, thus releasing the piston pressure on the liquid in cylinder 38. With such pressure removed, the liquid in the clearances under the influence of the driving plates 16 and 17 is able to pump itself, so to speak, back into cylinder 38. This action takes place owing to the fact that the driving plates 16, 17 impart a rotary shearing stress to the liquid in the clearances, thereby inducing rotary shear therein and producing normal forces in the liquid. The following consideration may be helpful to a better understanding of the normal forces effect: consider a pair of flat, circular, substantially parallel, coaxially disposed plates separated from each other by a small uniform gap which is filled with a liquid of the kind under consideration. If one of the plates is rotated relatively to the other, normal forces are produced which express themselves as forces which try to move the plates further apart. This may illustrate the direction of the forces. It should be noted that the normal forces occur along, i.e., parallel to, the common axis of rotation of the plates and also are distributed radially from the center of each plate to the periphery. The normal forces are greatest along the common axis and decrease steadily as one moves toward the periphery. At the periphery the normal forces are about zero. Summarizing, the normal forces are normal to the opposed radial surfaces of the plates; the forces occur along the axis of rotation of the plates and are radially distributed from such axis to the periphery; and the forces are greatest along the axis of rotation and zero at the periphery. It will be understood that references to normal force have the foregoing significance.

In the present environment, the liquid nearest the axis of rotation of plates 16, 17 and 21 exhibits the greatest normal force, and it will be seen from FIG. 1 that such liquid is adjacent the outer openings of the passages 63, 64, and 65. The normal force of such liquid causes it to flow through the passages into reservoir 38, thus depleting the chamber 33 and the various clearances. With no liquid present to supply the viscous drag effect, the clutch becomes disengaged.

It will be apparent that the piston and cylinder arrangement comprises a means for engaging the driving connection afforded by the liquid. It may also be apparent that the liquid itself, the clearances and passages, and the reservoir 38 provide means for disengaging the driving connection.

Free movement of the liquid between cylinder 38 and chamber 33 and back again, under only the opposing forces of the piston and the normal force produced in the liquid, is permitted by the air vent 74. The vent, which is open to atmosphere, extends through wall 31 and opens into chamber 33; it provides for a convenient reference pressure around the periphery of the plates. The vent may be dispensed with in cases where the air cap around the periphery of the plates experiences only a small compression-expansion action as liquid moves into chamber 33 and is withdrawn therefrom; in such cases the air should be retained in the chamber and not leak out.

During the time the clutch is engaged, it will be understood that plate 21 is rotated, together with drum 11 and pulley 12, the latter of which will be connected to a desired load. The pulley may rotate relatively to shaft 13 by means of the bearings 66 and 67 which are spaced apart by sleeve 75 disposed in recess 76. Oil seals are provided at 68, 69, 70, 71, 72 and 73. At 78 a space is provided for reception of seals 72 and 73.

Figure 3:
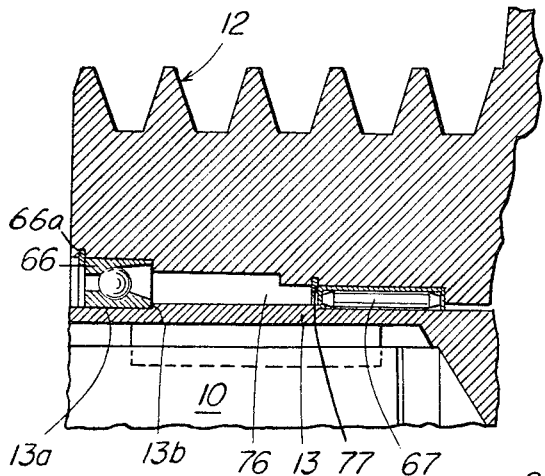
FIG. 3 is a cross-sectional side view of a detail of FIG. 1 showing a modification.

An alternative method for disposing the bearings 66 and 67 on shaft 13 is shown in FIG. 3 where the sleeve 75 is omitted. In place thereof, a snap ring 77 is provided to retain the needle bearing 67, while the bearing 66 is set in a reduced portion 13a of shaft 13 and abuts a shoulder 13b. Bearing 66 may be retained on the reduced portion 13a by a snap ring 66a, disposed to the left of the bearing as shown in FIG. 3.

Besides having the functions described, other functions described, of the liquid include a lubricating effect and a cooling effect.

Reservoir 38 may be located elsewhere than as shown so long as it is connected by one or more passages which open in the innermost portion of the shearing zone, the latter comprising the clearances 34, 35, 36, and 37. With passage openings so disposed, the shearing zone can be pumped substantially dry by the normal force effect. A preferred location of reservoir 38 is the one shown.

It should be pointed out in FIG. 1 that the rotatable plates 16, 17 and 21 are mounted for axial movement, but the extent of such movement is small owing to the fact that the gaps or clearances 34, 35, 36 and 37 are small, being no more than conventional manufacturing tolerances. It is considered that during operation of the clutch, these clearances will be substantially equal. It may be noted that although the clearances are not readily apparent in FIG. 1, they are of definite size and are readily entered by the liquid.

Figure 4:
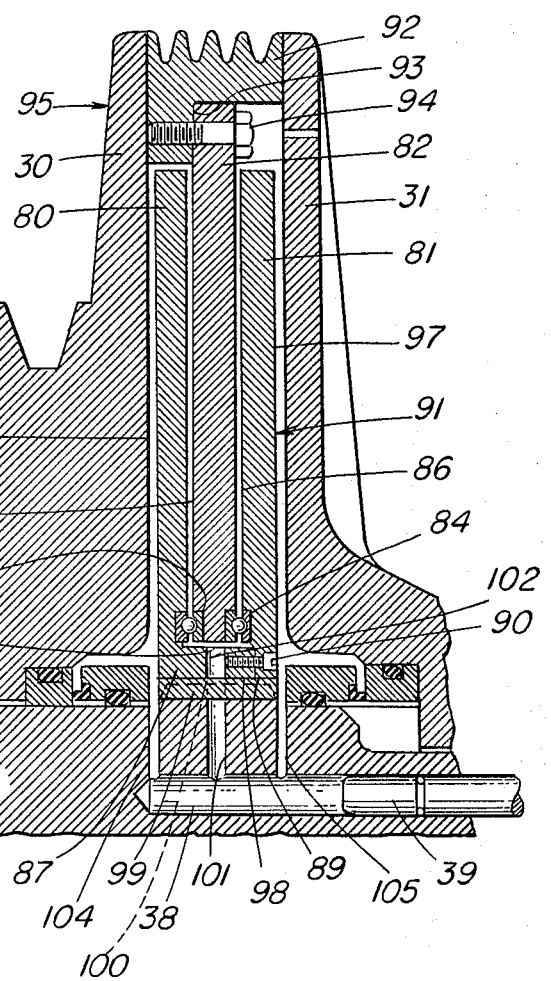
FIG. 4 is a cross-sectional side view of a modification of FIG. 1, showing only a part of the construction.

Another and more positive means of maintaining the clearances equal is illustrated in the modification of FIG. 4, where the driving plates 80, 81 are each spaced from driven plate 82 by bearing means in the form of thrust bearings 83, 84, respectively, thereby providing dimensionally controlled clearances 85, 86 which are of equal or substantially equal width. Plate 80 has a hub portion 87, while plate 81 has a portion 88 of reduced thickness adjacent its central aperture 89, and these portions interfit, as shown, and are suitably fastened as by bolts, one of which is shown at 90. Thus, the bolts 90 and the bearings 83 and 84 serve to hold the plates 80, 81 and 82 together as a unit, designated 91. The annular wall portion 92 has an inwardly extending annular shoulder 93 to which the driven plate 82 is fastened as by bolts 94, thus securing the unit to, and spacing the same in, the drum housing 95 comprising end pieces or end plates 30 and 31 and the portion 92. The clearances 96, 97 are dimensionally controlled when the said unit is secured in the housing 95.

Extending radially inwardly from the central aperture, designated 98-89, of driving plates 80 and 81 is a keyway 99 engaged by a key 100 on the shaft 13, by means of which engagement the driving plates are rotated by shaft 13. It may be noted that such engagement permits axial movement of the shaft.

Liquid is supplied to gaps 85 and 86 through the passage 101, the liquid flowing through a passage 102 in hub portion 87, and then into a horizontally shown clearance 103 which feeds the gaps 85 and 86. Gaps 96 and 97 are supplied by passages 104 and 105, respectively.

The remaining structures in FIG. 4 are the same as those described in FIG. 1 and need not be further discussed.

As will be understood, with the clearances 85, 86, 96 and 97 equal or substantially equal, any normal forces produced by the liquid therein are balanced, and the net result is that the driving plates 80 and 81 are able to efficiently drive the driven plates through the viscous drag effect.

Additional plates may, if desired, be added to the device of FIG. 4, without need of using additional thrust bearings, by axially locating all the driven plates relatively to one another and all the driving plates relatively to one another.

Figure 5:
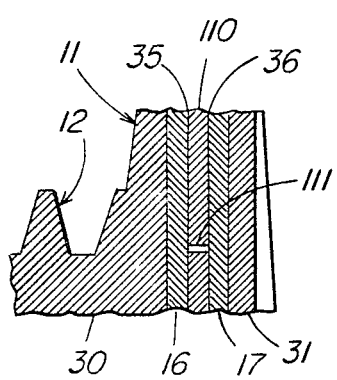
FIG. 5 is a fragmental view of a detail of FIG. 1 showing a modification.

Another means of maintaining equal or substantially equal clearances is illustrated in the modification of FIG. 5, the structure of which is exactly the same as in FIG. 1 except that the driven plate 110 is provided with one or more bleed holes 111 at an intermediate radius. These holes extend from one side of the plate to the other and act to equalize the pressures on both sides of the plate 110, and in consequence, to equalize the clearances 35, 36.

Figure 6:
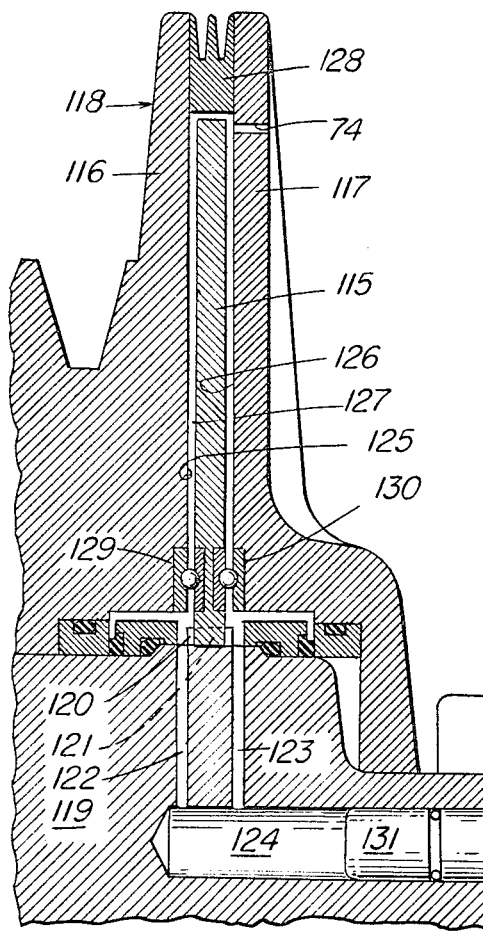
FIG. 6 is a partial, cross-sectional side showing another modification.

In FIG. 6, a modification is shown which illustrates the use of one driving plate, as at 115, while the end walls 116, 117 of the rotatable drum 118 serve as driven plates. Plate 115 is mounted on shaft 119 by a key and keyway arrangement 120, 121. Only two passages 122, 123 are required to connect reservoir 124 with the clearances 125, 126 formed in chamber 127. At its periphery, plate 115 is spaced from the annular wall 128 to permit rotation. Plate 115 is spaced from end plates 116, 117 by bearing means as in FIG. 4, comprising the thrust bearings 129 and 130, respectively, which axially locate plate 115 so as to equalize the gaps 125 and 126. Thus any normal force effects during clutch engagement are balanced. In other respects, the construction is the same as in FIG. 1. In operation, liquid in the clearances, which liquid for clarity of illustration is omitted, transmits the rotation of plate 115 by the viscous drag effect when piston 131 is moved to operative or clutch-engaging position; and when the piston is in inoperative position, liquid in the clearances is pumped back to the cylinder by normal force effect.

Figure 7:
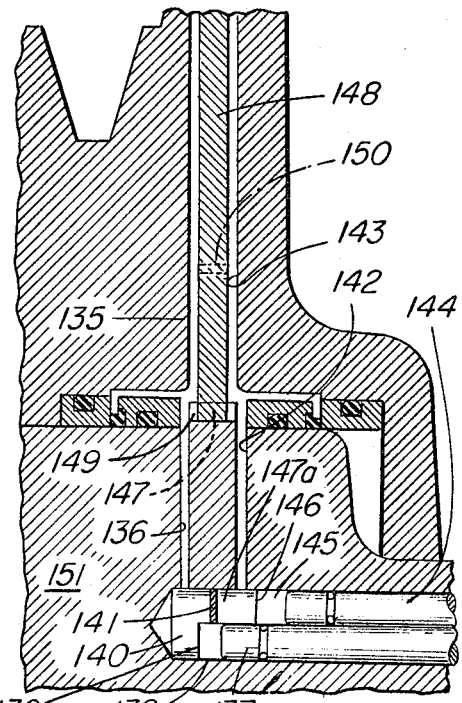
FIG. 7 is a view similar to FIG. 6 but showing a modification.

FIG. 7 is a modification of the clutch of FIG. 6 in that the thrust bearings of the latter are omitted and equal gaps are attained by using separate pistons or plungers to supply liquid to each gap. Thus gap 135 is supplied by passage 136 and by piston 137 which operates in the cylinder 138. The end 139 of this cylinder is open so that liquid may pass into the reservoir 140 and thence into passage 136. A barrier 141 prevents liquid from entering the passage 142. Gap 143 is supplied by passage 142 which in turn is supplied by piston 144 operating in the cylinder 145 having an open end 146. The barrier 141 prevents liquid in the reservoir 147a from entering the passage 136. It will be understood that the opposite ends of the pistons 137 and 144 are simultaneously engaged by the piston-moving means discussed in connection with FIG. 1, comprising the lever 52 together with extension 49, end piece 47, casing 48, and bearing 43.

It will be noted in FIG. 7 that driving plate 148 is axially movable by means of the key and keyway arrangement 149–147. The plate 148 is sealed by suitable conventional means not shown at the key-keyway 149–147 so that liquid does not transfer from passage 136, or the outlet thereof, to passage 142, or vice versa.

During clutching engagement, liquid is pumped into gaps 135 and 143 in the manner indicated. Should any normal force effect take place so as to axially move plate 148 to one side, thus decreasing the gap on that side and increasing it on the other, then by means of the separate pistons, a corrective action is possible. Referring to the narrower gap, the pressure adjacent shaft 151 can become higher than the pressure in that portion of the gap remote from shaft 151, owing to the fact that the gap is supplied by its own separate piston. By virtue of this pressure differential, the pressure in the narrower gap may increase until it is equal to that in the other gap, whereby the two gaps become equal.

If desired, one or more bleed holes may be provided in plate 148 at an intermediate radius in order to reduce the sealing requirement in the keyway while still retaining the corrective action described. One of the bleed holes is optionally shown at 150 and extends through the plate from side to side, serving to equalize the pressure on each side, whereby gaps 135 and 143 are equalized.

Except for the details described, the construction of FIG. 7 is like that of FIG. 6 and does not require further discussion.

Figure 8:
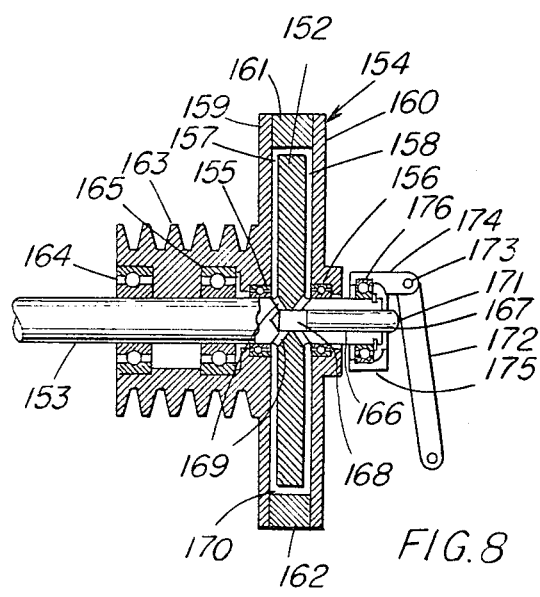
FIG. 8 is a more or less schematic view, showing another modification on a somewhat reduced scale.

In the modification of FIG. 8, which comprises a simplified showing on a somewhat reduced scale, the driving plate is integrally connected, in any suitable way, to the drive shaft so that it is movable therewith both axially and rotatably. The shaft is axially located with respect to the rotatable drum or housing by bearing means, thereby to provide equal gaps. More particularly, the driving plate 152 is integrally connected to the drive shaft 153. Bearings 155, 156 provide for gaps 157, 158 of equal width. The remainder of the construction of FIG. 8 is believed to be clear. Thus, drum 154 comprises the end walls or end plates 159, 160 and the annular wall portions 161, 162. End wall 159 is connected to pulley portion 163 which is supported on shaft 153 by the spaced bearings 164, 165. Shaft 153 has a central bore 166 in which a piston 167 is slidable, there being formed a reservoir 168 at the inner portion of the bore. Liquid in the reservoir is forced by piston 167 through passages 169 to the gaps 157 and 158 and also to the peripheral clearance at 170. The other end 171 of the piston is engaged by lever 172 which is operative to move the piston toward the reservoir 168. Lever 172 is pivoted at 173 to support 174 which is connected to a casing 175, the latter being supported for rotation on the bearing 176. Operation of the lever is similar to that described in connection with FIG. 1.

Turning now to the liquid, it is described above as viscoelastic; i.e., a liquid which exhibits both viscous and elastic behavior; thus it has flow properties of a liquid and elastic properties of a solid.

Besides being viscoelastic, the liquid is one which exhibits the phenomenon described, namely, during rotary shear, as brought about by the application of a rotary shearing stress, it produces a force normal to the described power transmitting surfaces.

The liquid is of course a viscous one, for it is by virtue of this property that the driving plates transmit motion through the liquid film to the driven plates. This type of drive is per se conventional, being known as a viscous-drag drive. A viscous liquid is required for a strong normal force effect.

An example of a suitable liquid is a 25% by weight solution in mineral oil of polyalkylmethacrylate of a viscosity average molecular weight of about 200,000. The mineral oil has a kinematic viscosity of about 18 centistokes at 100° F. and about 4.5 centistokes at 210° F. This solution exhibits an apparent viscosity of about 30 poises at a shear rate of one reciprocal second and at 77° F. At shear rates ranging from about 100 to 1,000 reciprocal seconds, and at a temperature of 77° F., the liquid exhibits a normal force, expressed as lbs. of total thrust, ranging from about 0.02 to about 0.2 lb. when tested in a parallel plate rheogoniometer having a shearing element of a radius of only 0.79 inch and a maximum speed of only about 100 r.p.m. This relationship between normal force and shear rate is nearly a linear one for this liquid. On scale up, the thrust value would reach a maximum of 8 lbs. at 1000 reciprocal seconds on increasing the radius of the shearing element to 5 inches; and if the rotary speed were increased 10 times, the shear rate would increase to 10,000 reciprocal seconds and the thrust, which increases linearly with shear rate, would increase to 80 lbs. It is thus apparent that the liquid is capable of a normal force of substantial value.

Besides the liquid described, a number of viscoelastic liquids which exhibit the normal force phenomenon are available and may be chosen from both aqueous and non-aqueous systems. They include solutions of high polymers in non-aqueous solvents, high polymers in liquid form, and solutions of certain soaps dissolved in hydrocarbon solvents. More particularly, the liquids include polyisobutylene in mineral oil, poly(alkyl methacrylates) in mineral oil or in dimethylphthalate, polyisobutylene in decalin or in o-dichlorobenzene, rubber in xylene or in benzene, polystyrene in decalin or in dimethylphthalate, methylcellulose or sodium carboxymethylcellulose in water, aluminum or calcium soaps of fatty or naphthenic acids dissolved in hydrocarbons, glue in water, etc.

Desirably these liquids should have an apparent viscosity in the range of about 1 to 1000 poises or more at a shear rate in the range of about 10,000 to 1 reciprocal seconds; and they may exhibit a normal force of up to several hundred pounds of thrust, or from a few tenths, or even hundredths, to one or two hundred p.s.i. These are illustrative values.

Of interest is the fact that when the shear zone of the above-described rheogoniometer is filled with liquid, the rotary speed of the shearing element or plate varies directly with the normal force, i.e., the normal force increases with increasing speed of the plate. It is also interesting to note that while the rotary stress applied to a liquid increases with the shear rate, the normal force increases with the shear rate even more rapidly than the rotary stress. Thus, at a shear rate of 100 reciprocal seconds, the normal force may be up to 10 times greater, or more, than the rotary stress.

As an example illustrative of the invention, let it be assumed that an electric motor of 50 HP and 1750 r.p.m. is to drive a load having a breakaway or starting torque of twice the rated torque of the drive motor. A clutch having four pairs of working or power transmitting surfaces, constructed as in FIGS. 1, 3, 4, or 5, to transmit the power may have a driving plate of a radius of about 12 cm., measured to the outside of the active liquid zone, and a radius measured to the inside of the active liquid zone of about 4 cm. These values substantially define a plate of about 12 cm. radius having a central aperture of about 4 cm. radius. The clearances have a width of about 0.01 cm. The amount of liquid required is about 0.82 cc. (0.05 cu. in.) per HP, or a total of about 41 cc. The liquid may have an apparent viscosity of about 100 poises at a shear rate of one reciprocal second; and may exert a normal force of about 15.5 p.s.i., which is sufficient to pump the liquid from the clearances back to the cylinder, thus disengaging the clutch.

Referring generally to the clutch, it may be pertinent to note that its physical size is substantially that of conventional friction clutches of comparable rating. The number of pairs of power transmitting surfaces is variable, thus it may have one, two, three or more. A preferred arangement is to utilize both sufaces of the driving plates as power transmitting surfaces, as in FIGS. 1–5. The maximum clearance between a pair of such surfaces is variable, depending on the physical design of the unit, but should be consistent with good torque transmission. The minimum clearance is such that metallic contact is avoided. A suitable clearance is of the order of 0.01 cm. The amount of liquid present in the clearance also depends on the physical design.

The engaging rate of the clutch may be varied over a wide range, as by controlling the flow of liquid.

The term "liquid" means all fluids other than gases.

The term "outer," as used in connection with points disposed radially of the plates, refers to points disposed toward the periphery of the plates, while "inner" refers to points disposed toward the axis of rotation of the plates.

It will be understood that the invention is capable of obvious variations without departing from its scope.

In the light of the foregoing description, the following is claimed:

1. A clutch comprising a rotatable driving plate and axially spaced therefrom a rotatable driven plate, adjacent surfaces of the plates forming a pair of power transmitting surfaces with a clearance therebetween, a reservoir of a viscoelastic liquid adjacent said clearance, means for pumping liquid from the reservoir to said clearance and maintaining the same therein, whereby said driving plate is able to transmit torque to the driven plate through the viscous drag of the liquid, said liquid being subjected to a rotary shearing stress by said driving plate whereby it undergoes rotary shear and produces a force normal to said plates, said foce, upon release of said pumping means, being effective to move said liquid from the clearance back to said reservoir, thereby disengaging the clutch.

2. The clutch of claim 1 wherein a driving plate is disposed on each side of the driven plate, thereby to form therewith two pairs of said power transmitting surfaces.

3. The clutch of claim 1 wherein a plurality of driving plates and a plurality of driven plates are interleaved, thereby to form a plurality of said pairs of power transmitting surfaces.

4. In a clutch comprising a driving member, a driven member, and means intermediate said members for providing a driving connection therebetween, the improvement comprising a pair of driving plates mounted on the driving member for rotation therewith, a driven plate on the driven member mounted for rotation therewith and interleaved with said driving plates such that clearances are present therebetween, said driven member comprising a rotatable drum enclosing said plates and forming a chamber thereabout, a viscoelastic liquid-filled cylinder in said driving member having a piston slidable therein, a passage in the driving member connecting the cylinder to said chamber, means for moving said piston in the cylinder to displace liquid therefrom into said chamber and into said clearances, whereby a driving connection is provided between said driving and driven plates in the form of the viscous drag of said liquid, said liquid being subjected to a rotary shearing stress by said driving plates, whereby the liquid undergoes rotary shear and produces a force normal to said plates, said force being effective, upon release of said piston-moving means, to move said liquid from the clearances back to said cylinder, thereby disengaging the clutch.

5. The clutch of claim 4 wherein said plates are closely disposed relatively to each other and to said drum, thereby to provide substantially equal clearances.

6. The clutch of claim 4 wherein said driven plate is spaced from said driving plates by bearing means, thereby to provide substantially equal clearances.

7. The clutch of claim 4 wherein said driven plate has at least one bleed opening to permit opposite sides thereof to have substantially equal pressures, thereby to provide substantially equal clearances.

8. The clutch of claim 4 wherein a pair of passages supply said chamber, each passage having a separate cylinder and piston to supply liquid thereto, thereby to maintain equal pressures in said clearances and to provide equal clearances.

9. In a clutch comprising a driving member, a driven member, and means intermediate said members for providing a driving connection therebetween the improvement comprising a driving plate mounted on the driving member for rotation therewith, a driven plate on the driven member mounted for rotation therewith and interleaved with said driving plate such that a clearance is present therebetween, said driven member comprising a rotatable drum enclosing said driving plate and forming a chamber thereabout, a viscoelastic liquid-filled cylinder in said driving member having a piston slidable therein, a passage in the driving member connecting the cylinder to said chamber, means for moving said piston in the cylinder to displace liquid therefrom into said chamber and into said clearance, whereby a driving connection is provided between said driving and driven plates in the form of the viscous drag of said liquid, said liquid being subjected to a rotary shearing stress by said driving plates whereby the liquid undergoes rotary shear and produces a force normal to said plates, said force being effective upon release of said piston-moving means, to move said liquid from the clearance back to said cylinder, thereby disengaging the clutch 10. The clutch of claim 9 wherein said driving plate is integrally connected to said driving member and the latter is axially located relatively to said drum by bearing means, thereby to provide substantially equal clearances.

11. The clutch of claim 9 wherein said driving plate is spaced from said drum by bearing means.

References Cited

UNITED STATES PATENTS

| | | | |
|---|---|---|---|
| 1,192,233 | 7/1916 | Severy | 192—58 X |
| 2,015,626 | 9/1935 | Heath | 192—58 X |
| 2,714,946 | 8/1955 | Tenot et al. | 192—58 |
| 2,988,188 | 6/1961 | TauScheck | 192—58 X |
| 3,059,745 | 10/1962 | TauScheck | 192—58 |

BENJAMIN W. WYCHE III, *Primary Examiner.*